(12) United States Patent
Tsunoda

(10) Patent No.: US 8,171,763 B2
(45) Date of Patent: May 8, 2012

(54) STEERING LOCK DEVICE-ADDED STRUCTURE

(75) Inventor: Hiroyasu Tsunoda, Chigasaki (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 807 days.

(21) Appl. No.: 12/199,868

(22) Filed: Aug. 28, 2008

(65) Prior Publication Data

US 2009/0056394 A1 Mar. 5, 2009

(30) Foreign Application Priority Data

Aug. 31, 2007 (JP) ................. 2007-225218

(51) Int. Cl.
*B60R 25/02* (2006.01)
*F16C 3/00* (2006.01)
*G05G 5/00* (2006.01)

(52) U.S. Cl. ............... 70/186; 70/252; 70/182; 70/183; 70/184; 70/185

(58) Field of Classification Search ............ 70/252, 70/182, 183, 184, 185, 186
See application file for complete search history.

(56) References Cited

U.S. PATENT DOCUMENTS

| | | | | |
|---|---|---|---|---|
| 3,792,626 A | * | 2/1974 | Durkee et al. | 74/492 |
| 3,815,437 A | * | 6/1974 | Martin | 74/492 |
| 4,719,986 A | | 1/1988 | Richardson, Jr. | |
| 5,495,732 A | | 3/1996 | Nagae et al. | |
| 5,802,924 A | * | 9/1998 | Johnson et al. | 74/484 R |
| 6,616,185 B2 | * | 9/2003 | Manwaring et al. | 280/775 |
| 7,350,816 B2 | * | 4/2008 | Ishida et al. | 280/777 |

FOREIGN PATENT DOCUMENTS

| | | |
|---|---|---|
| CN | 1817690 A | 8/2006 |
| DE | 19713318 C1 | 8/1998 |
| JP | 57-175449 A | 10/1982 |
| JP | 2003-40080 A | 2/2003 |
| JP | 2005-178436 A | 7/2005 |

* cited by examiner

*Primary Examiner* — Suzanne Barrett
*Assistant Examiner* — David E Sosnowski
(74) *Attorney, Agent, or Firm* — Foley & Lardner LLP

(57) ABSTRACT

A steering lock device-added structure includes: a steering shaft; a steering column which rotatably houses the steering shaft therein; and a steering lock unit which is disposed on an outside surface of the steering column, and disables rotation of the steering shaft. The steering lock unit is coupled to the steering column while interposing a fracture inducing portion therebetween. The steering lock device-added structure further includes: a steering lock protective member which covers an outside surface of the steering lock unit; and a column protective member which covers a lower surface of the steering column, and is provided adjacent to the steering lock protective member.

5 Claims, 10 Drawing Sheets

VEHICLE WIDTH DIRECTION

FIG. 7
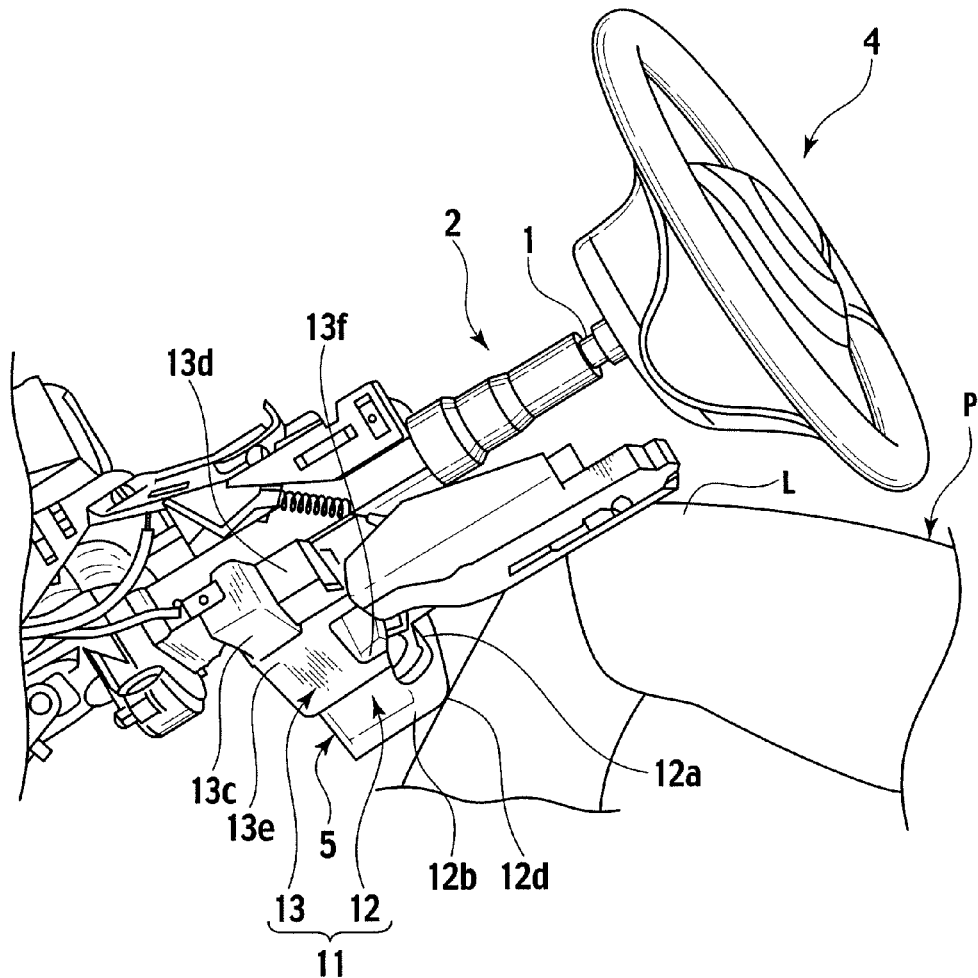
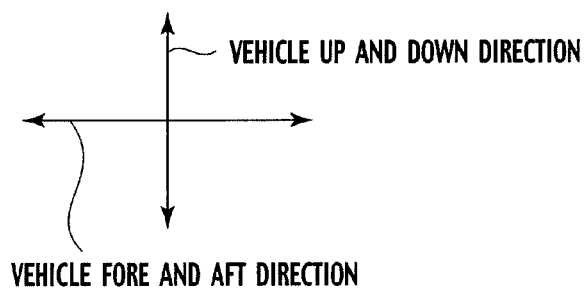

STEERING LOCK DEVICE-ADDED STRUCTURE

BACKGROUND OF THE INVENTION

1. Field of the Invention

The present invention relates to a steering lock device-added structure that locks rotation of a steering shaft of a vehicle. In particular, the present invention relates to a steering lock device-added structure that, even in the case where a steering lock unit separates and drops from a steering column owing to the fact that a load is applied thereto, is capable of suppressing an influence of this case to a passenger (a driver).

2. Description of the Related Art

As a conventional steering lock device-added structure in a vehicle, one described in Japanese Patent Laid-Open Publication No. 2003-40080 is known. In this structure, a steering lock unit is provided on a lower side of a steering column that rotatably houses a steering shaft therein. This steering lock unit locks the steering shaft so that the steering shaft cannot rotate, or releases such locking.

In such a conventional steering lock device-added structure, a fracture inducing portion is formed on a coupling portion between the steering column and the steering lock unit.

Next, a description will be made of functions and effects of this steering lock device-added structure. In this conventional structure, when the passenger's knee or the like strikes against the steering lock unit at the time of collision of the vehicle, the steering lock unit is permitted to rotate upward by the fracture inducing portion. Accordingly, an impact applied to the passenger is absorbed, and an influence given to the passenger at the time of the collision can be suppressed to a predetermined value or less.

BRIEF SUMMARY OF THE INVENTION

However, in the conventional steering lock device-added structure, there is an apprehension that the steering lock unit may separate and drop from the steering column by the fracture inducing portion. In such a case, the steering lock unit thus separated has had such a problem that it bounces off some spot in a vehicle cabin, or rolls to the foot of the passenger, thereby hitting against the leg of the passenger.

The present invention has been made in consideration for such a problem inherent in the related art. It is an object of the present invention to provide a steering lock device-added structure that, even in the case where the steering lock unit separates and drops from the steering column, is capable of reducing an influence of this case to the passenger.

According to one aspect of the present invention, there is provided a steering lock device-added structure comprising: a steering shaft; a steering column which rotatably houses the steering shaft therein; a steering lock unit which is disposed on an outside surface of the steering column, and disables rotation of the steering shaft, wherein the steering lock unit is coupled to the steering column while interposing a fracture inducing portion therebetween; a steering lock protective member which covers an outside surface of the steering lock unit; and a column protective member which covers a lower surface of the steering column, and is provided adjacent to the steering lock protective member.

BRIEF DESCRIPTION OF THE SEVERAL VIEWS OF THE DRAWING

FIG. 7 is a side view showing a state where the passenger's knee abuts on the protective member in the steering equipment including the steering lock device-added structure according to the embodiment, when viewing the steering equipment from a left side.

DETAILED DESCRIPTION OF THE INVENTION

A description will be made below of a steering lock device-added structure according to an embodiment of the present invention based on the drawings.

Figure 1:
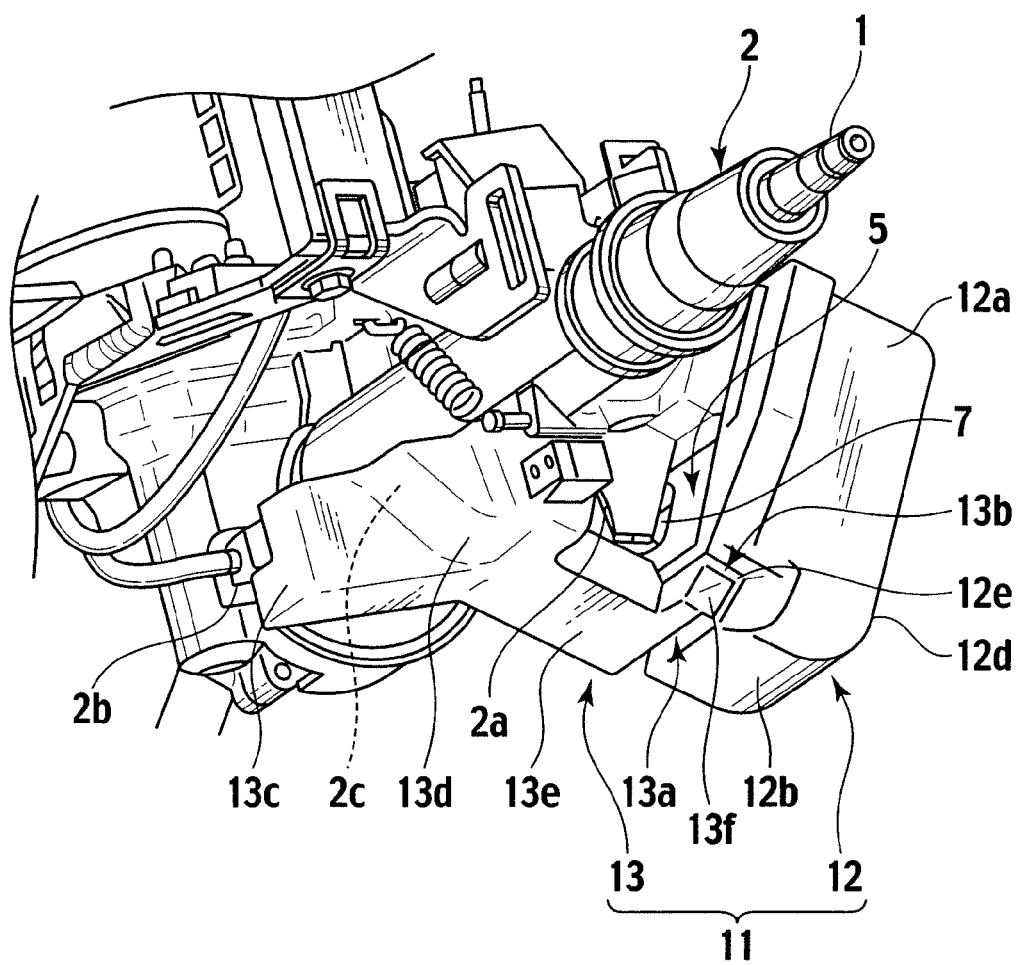
FIG. 1 is a perspective view showing an entire configuration of a steering lock device-added structure according to an embodiment of the present invention in a state where a steering wheel is detached therefrom.
Figure 2:
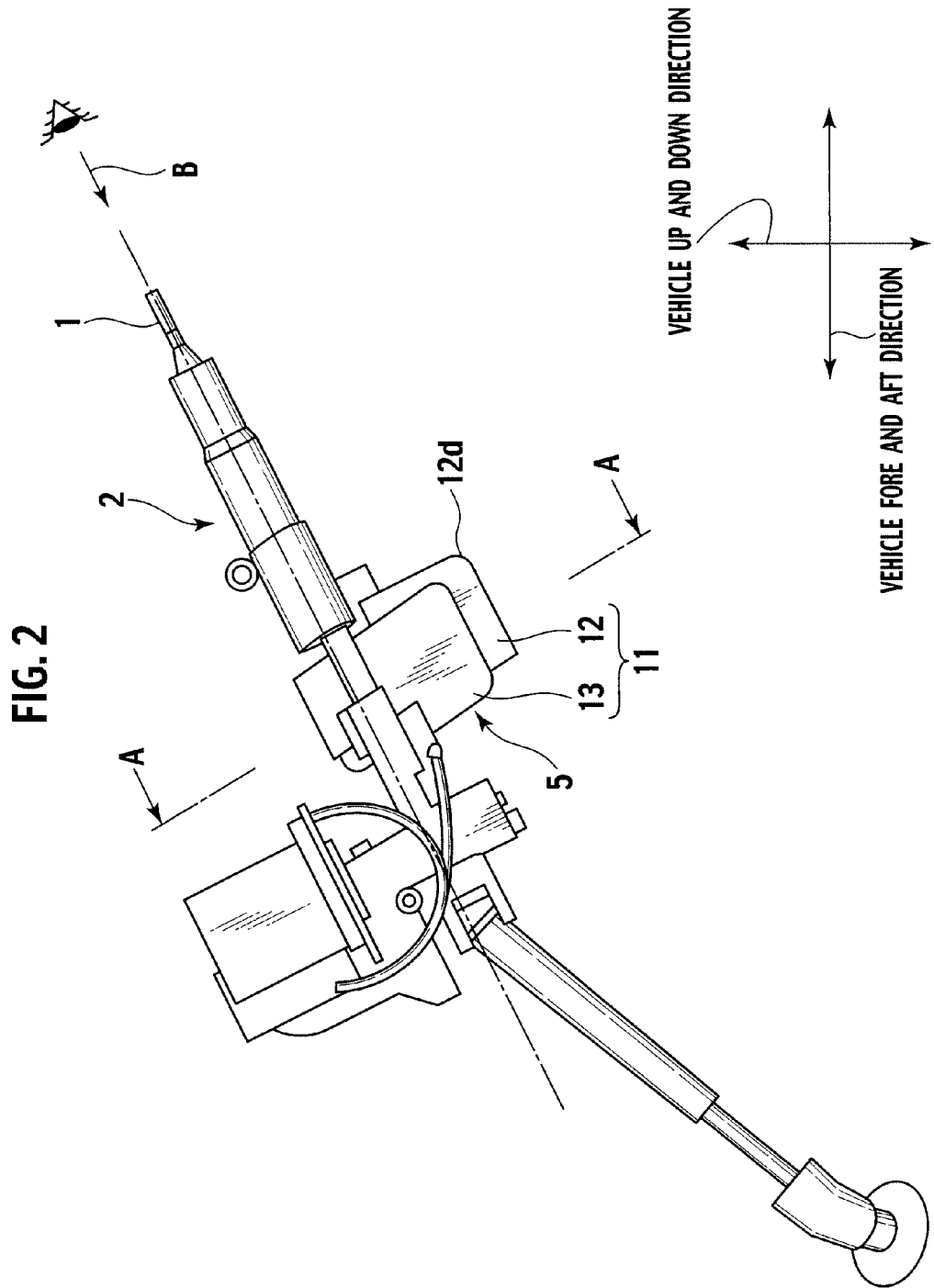
FIG. 2 is a side view of a steering equipment including the steering lock device-added structure according to the embodiment.
Figure 3:
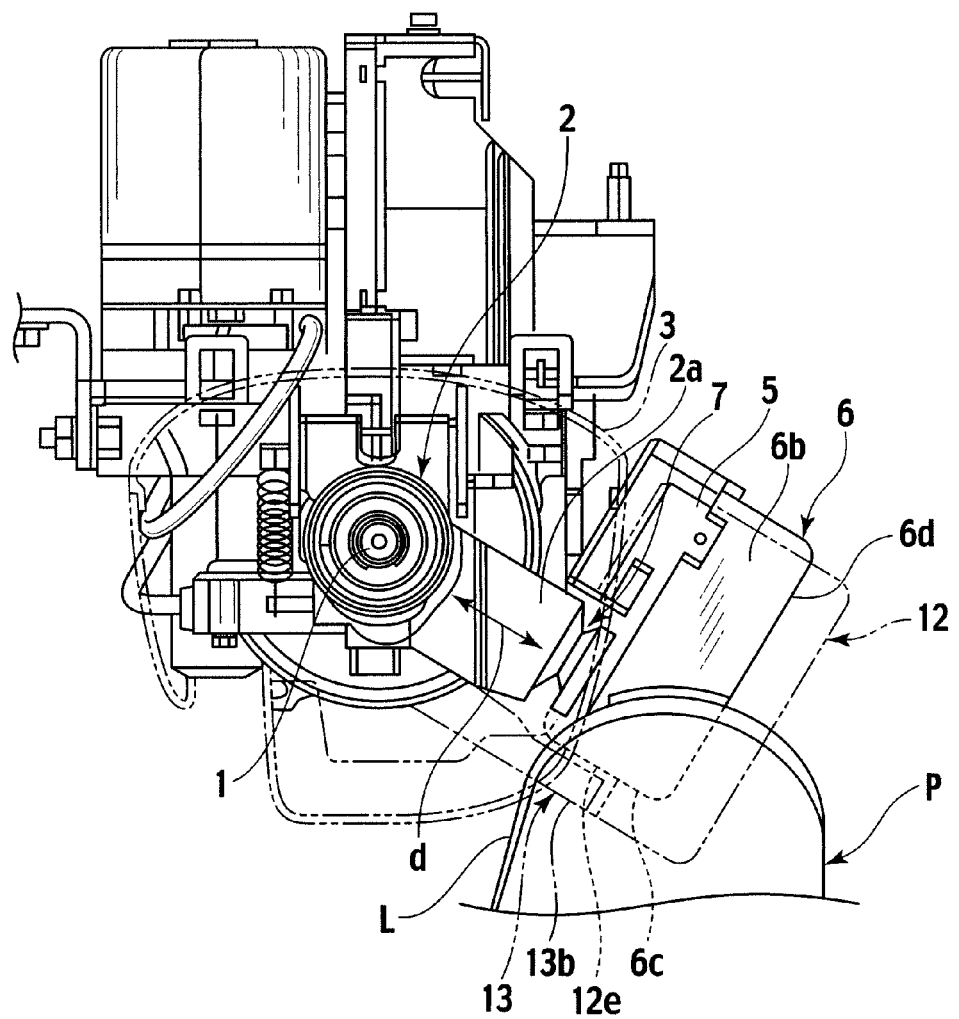
FIG. 3 is a front view of the steering equipment including the steering lock device-added structure according to the embodiment, when viewed from a direction of an arrow B in FIG. 2.
Figure 6:
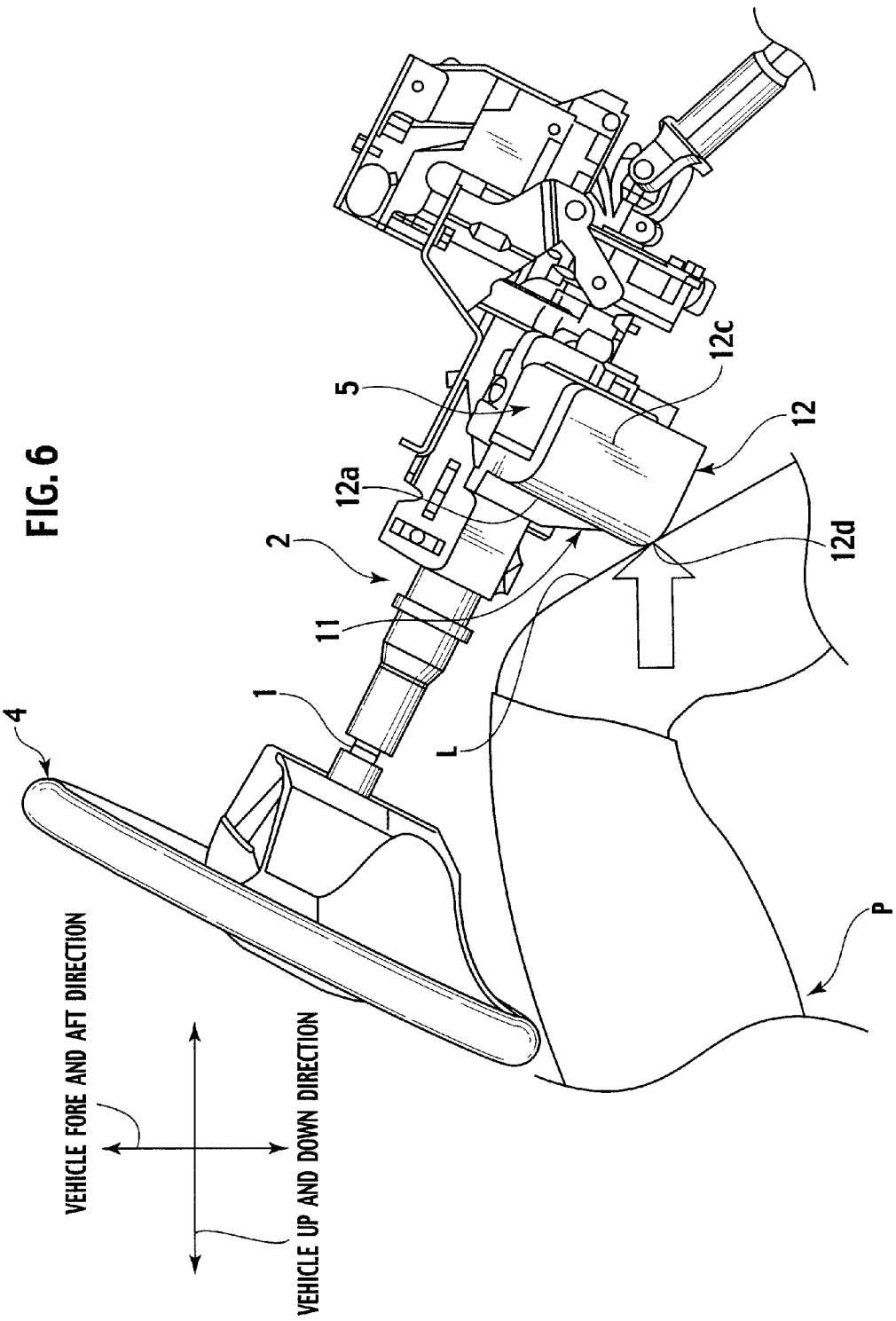
FIG. 6 is a side view showing a state where the passenger's knee abuts on an protective member in the steering equipment including the steering lock device-added structure according to the embodiment, when viewing the steering equipment from a right side.

FIG. 1 to FIG. 10 are views showing a steering lock device-added structure according to the embodiment of the present invention. First, a description will be made of an entire configuration of the steering lock device-added structure. As shown in FIGS. 1 and 2, in the steering lock device-added structure of a vehicle, which is according to the embodiment, a steering column 2 that rotatably houses a steering shaft 1 therein is provided. In this structure, as shown in FIG. 3, a steering column cover 3 is provided on a periphery of the steering column 2. Moreover, as shown in FIGS. 6 and 7, a steering wheel 4 is mounted onto a tip end of the steering shaft 1.

Moreover, a unit attachment arm 2a that has a hollow cylindrical shape is integrally attached to an outside surface of the steering column 2. As shown in FIG. 3, the unit attachment arm 2a is extended from the steering column 2 obliquely downward to a right side. Onto the unit attachment arm 2a, a steering lock unit 5 that disables rotation of the steering shaft 1 is mounted.

Figure 4:
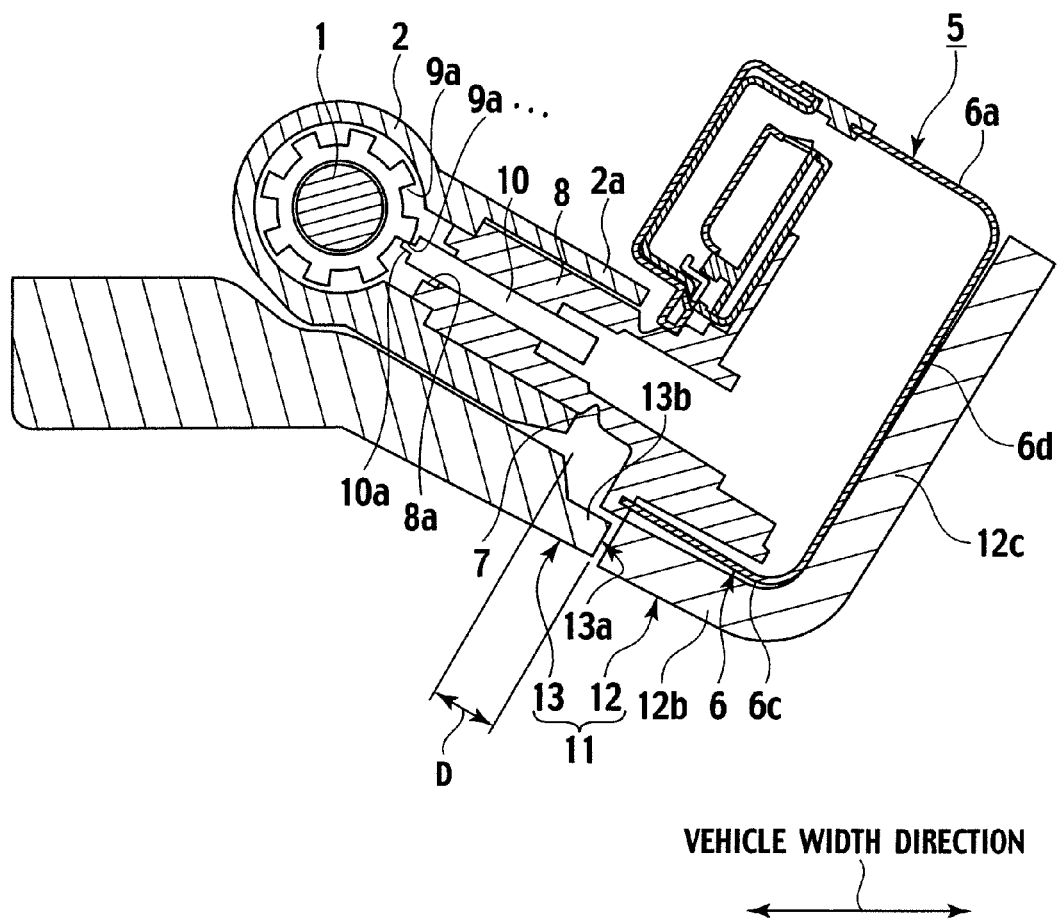
FIG. 4 is a cross-sectional view of showing a configuration of the steering lock device at a position along a line A-A in FIG. 2 in the steering lock device-added structure according to the embodiment.
Figure 5:
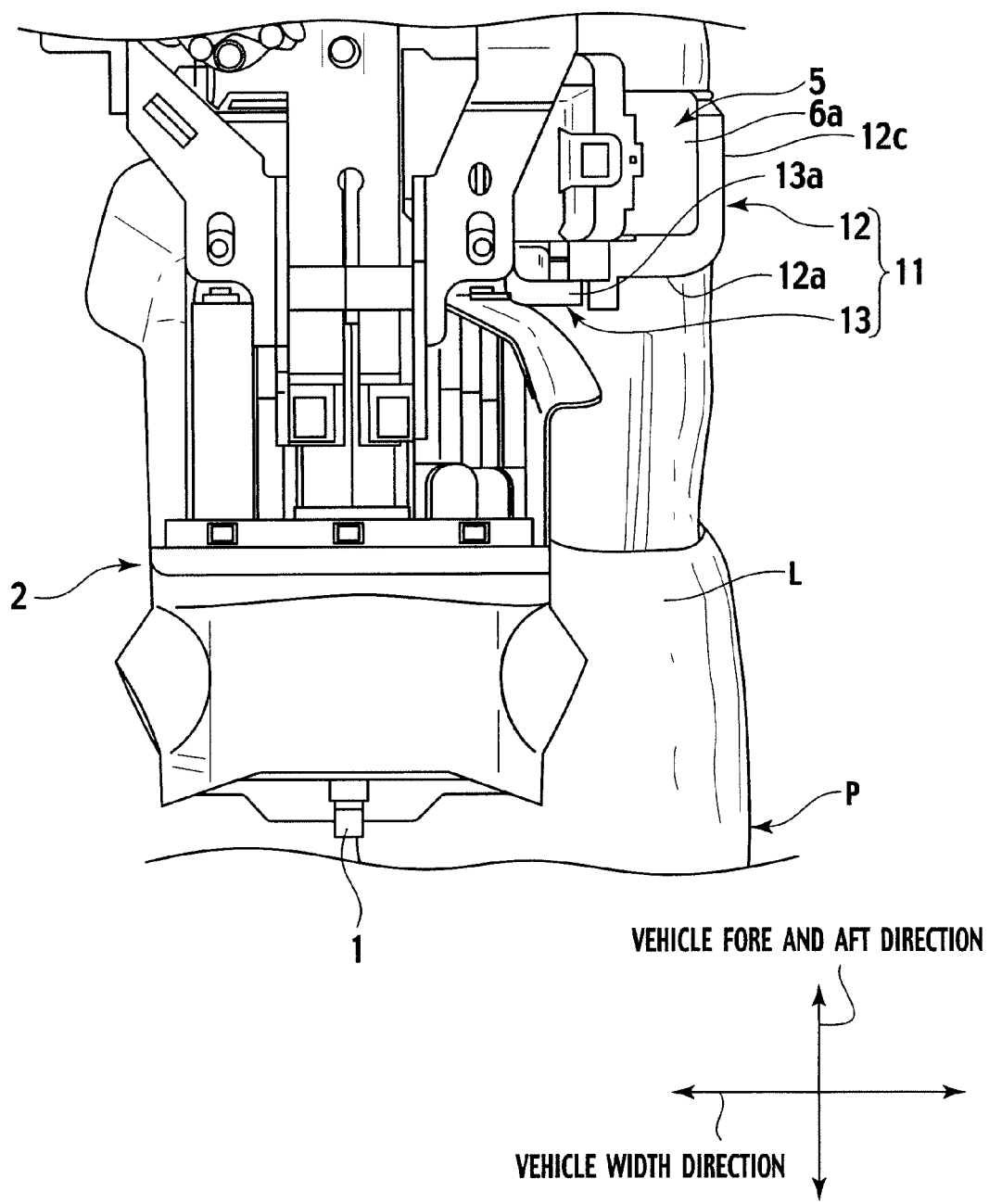
FIG. 5 is a plan view of the steering equipment including the steering lock device-added structure according to the embodiment.

As shown in FIG. 4, the steering lock unit 5 is covered with a metal-made cover member 6a. Moreover, the steering lock unit 5 includes a steering lock body 6 that builds a lock actuator (not shown) therein. Furthermore, an insert coupling portion 8 is integrally connected to the steering lock body 6 while interposing therebetween a constricted portion 7 as a fracture inducing portion that is thin. As shown in FIG. 4, the constricted portion 7 is composed so that a cross-sectional area thereof in a direction perpendicular to a sliding direction of a rod member 10 can be smaller than a cross-sectional area of the insert coupling portion 8 that excludes the constricted portion 7.

This insert coupling portion 8 is inserted into and attached to the unit attachment arm 2a integrally extended obliquely downward from the outside surface of the steering column 2. In such a way, the insert coupling portion 8 functions as a coupling portion between the steering column 2 and the steering lock unit 5. The steering lock unit 5 is composed so as to protrude from the steering column 2 by the unit attachment arm 2a and the insert coupling portion 8.

In an inside of the insert coupling portion 8, the rod member 10 is slidably housed. A tip end portion 10a of the rod member 10 engages with any of protrusions 9a, 9a . . . of a lock collar 9 integrally fixed to a periphery of the steering shaft 1 provided so as to be freely rotatable. The tip end portion 10a protrudes and retreats from an opening 8a formed on a tip end of the insert coupling portion 8a by actuation of the lock actuator.

Together with the steering column 2, the steering lock unit 5 is covered with an protective member 11 divided into two pieces, which are a steering lock protective member 12 and a column protective member 11. The steering lock protective member 12 covers outside surfaces of the steering lock unit 5. The column protective member 13 covers a lower surface of the steering column 2.

Specifically, in the steering lock device-added structure according to this embodiment, the protective member 11 is composed of the steering lock protective member 12 and the column protective member 13, which are formed independently of each other. Moreover, the steering lock protective member 12 and the column protective member 13 are provided adjacent to each other in a vehicle width direction, and become apparently integrate with each other in a state where the steering lock unit 5 is mounted onto the steering column 2.

In this structure, as shown in FIG. 1, the steering lock protective member 12 covers the cover member 6a of the steering lock unit 5. Specifically, as shown in FIGS. 1 and 4, the steering lock protective member 12 includes: a back surface portion 12a that covers a back side surface 6b of the cover member 6a; a lower surface portion 12b that covers a lower side surface 6c of the cover member 6a; and an outside surface portion 12c that covers a right side surface 6d of the cover member 6a. On a corner portion 12d that becomes a vertex on a rear end of the steering lock protective member 12, as shown in FIG. 1, three surfaces which are the back surface portion 12a, the lower surface portion 12b and the outside surface portion 12c are matched together substantially perpendicularly from three orientations, and are integrated together.

Figure 8:
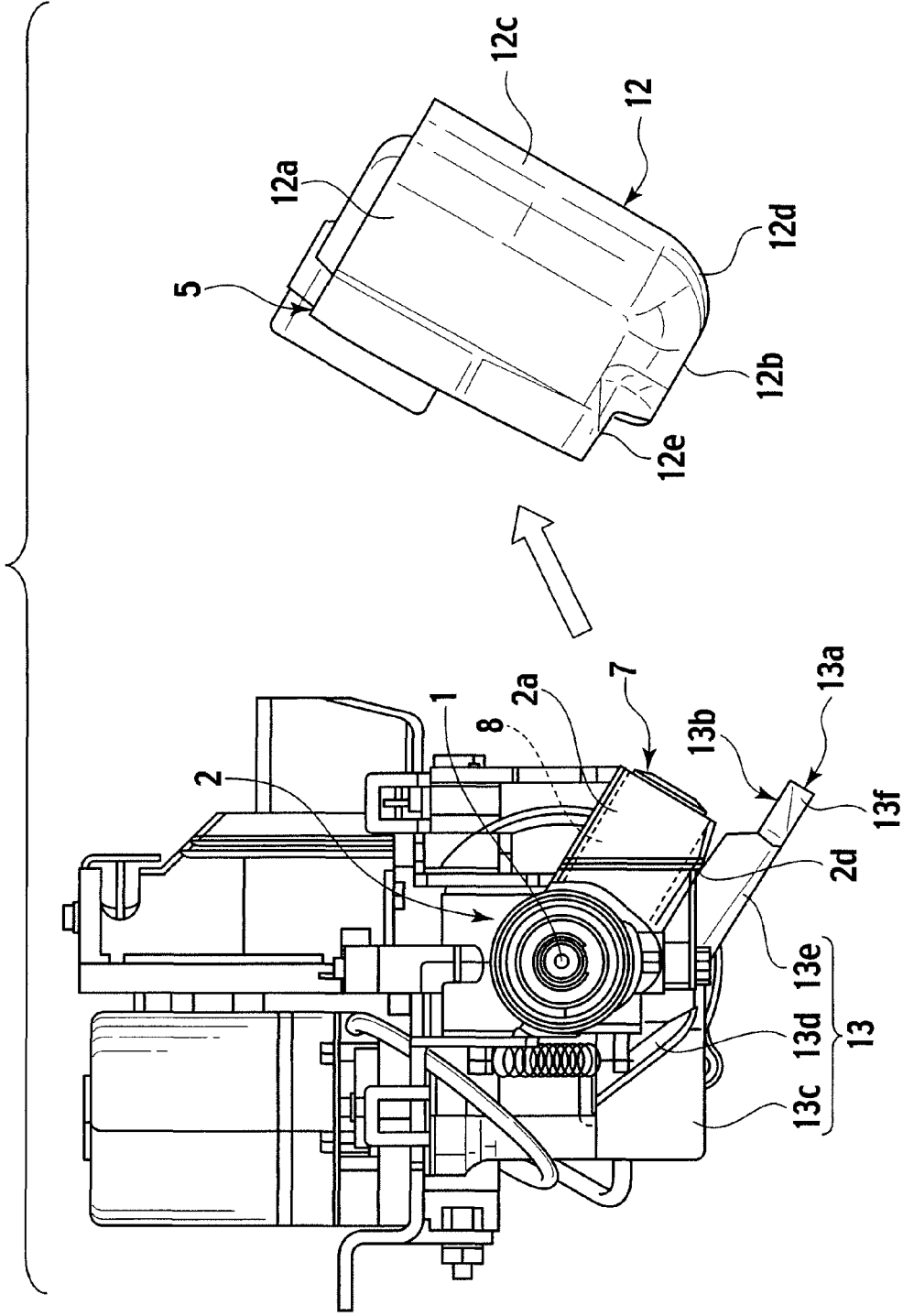
FIG. 8 is a front view showing a state where a steering lock body of the steering lock device separates and drops from a constricted portion of the steering lock device-added structure according to the embodiment.

Moreover, as shown in FIG. 8, a recess 12e is provided on an edge of the lower surface portion 12b of the steering lock protective member 12 on the steering shaft 1 side. The recess 12e is formed by denting a part of the lower surface portion 12b.

The steering lock protective member 12 sometimes drops from the steering column 2 together with the steering lock body 6 of the steering lock unit 5 owing to a fracture of the constricted portion 7. When the steering lock body 6 drops from the steering column 2 owing to the fracture from the constricted portion 7, the steering lock protective member 12 can independently separate from the column protective member 13. Specifically, the steering lock protective member 12 is composed so as to attach the back surface portion 12a, lower surface portion 12b and outside surface portion 12c thereof onto three surfaces of the cover member 6a of the steering lock body 6, which are the back side surface 6b, the lower side surface 6c and the right side surface 6d, respectively. In this embodiment, as shown in FIG. 3, the steering lock protective member 12 is mounted onto the steering column 2 by being made to cover the steering column 2 from the right side. Here, the right side corresponds to sides in an outside direction of the back side surface 6b, the lower side surface 6c and the right side surface 6d in the cover member 6a.

Moreover, as shown in FIG. 1, the column protective member 13 mainly includes a box-like extended portion 13c, a column covering portion 13d, and an arm covering portion 13e. The box-like extended portion 13c covers a connector 2b for harnesses and the like, which is extended from a left side surface of the steering column 2. The column covering portion 13d covers a cylindrical steering column body 2c in which the steering shaft 1 is built. The arm covering portion 13e is integrally extended from the column covering portion 13d obliquely downward toward the right side of the vehicle. As shown in FIG. 8, the arm covering portion 13e covers a lower surface 2d of the unit attachment arm 2a so as to go along the unit attachment arm 2a. Here, into an inside of the unit attachment arm 2a, the insert coupling portion 8 of the steering lock unit 5 is fitted.

As described above, the column protective member 13 covers the lower surface of the steering column 2. A lock unit-side edge portion 13a of the arm covering portion 13e as a part of the column protective member 13 has a neck portion 13b. The neck portion 13b is extended downward of the constricted portion 7. Further, the neck portion 13b is composed so as partially overlap the recess 12e in an up and down direction of a vehicle body.

Moreover, in this embodiment, the column protective member 13 composed of the above-described portions is fixedly attached to the lower surface of the steering column 2 in a covering manner. Accordingly, the column protective member 13 is fixed to the lower surface 2d of the unit attachment arm 2a independently of the steering lock protective member 12. Therefore, the column protective member 13 is composed so as to remain on the steering column side even if the steering lock protective member 12 is separated from the steering column 2 together with the steering lock body 6 when the steering lock body 6 drops.

Furthermore, as shown in FIG. 4, a tip end position of the lock unit-side edge portion 13a is extended so as to have an offset amount of a dimension D with respect to a cut position of the constricted portion 7 toward a lower right direction viewed from an axis of the rod member 10. Then, even in a state where the steering lock body 6 is spaced apart from the steering column 2 as shown in FIG. 8, the tip end position of the lock unit-side edge portion 13a is extended with the offset amount of the dimension D below the constricted portion 7 that is fractured. Moreover, also in the horizontal direction, the tip end position of the lock unit-side edge portion 13a is present more on a right side in the vehicle width direction than the constricted portion 7. In such a way, the constricted portion 7 is covered with the neck portion 13b formed on the lock unit-side edge portion 13a of the column protective member 13, and accordingly, the leg L of the passenger P does not directly abut on such a fractured portion.

Figure 9:
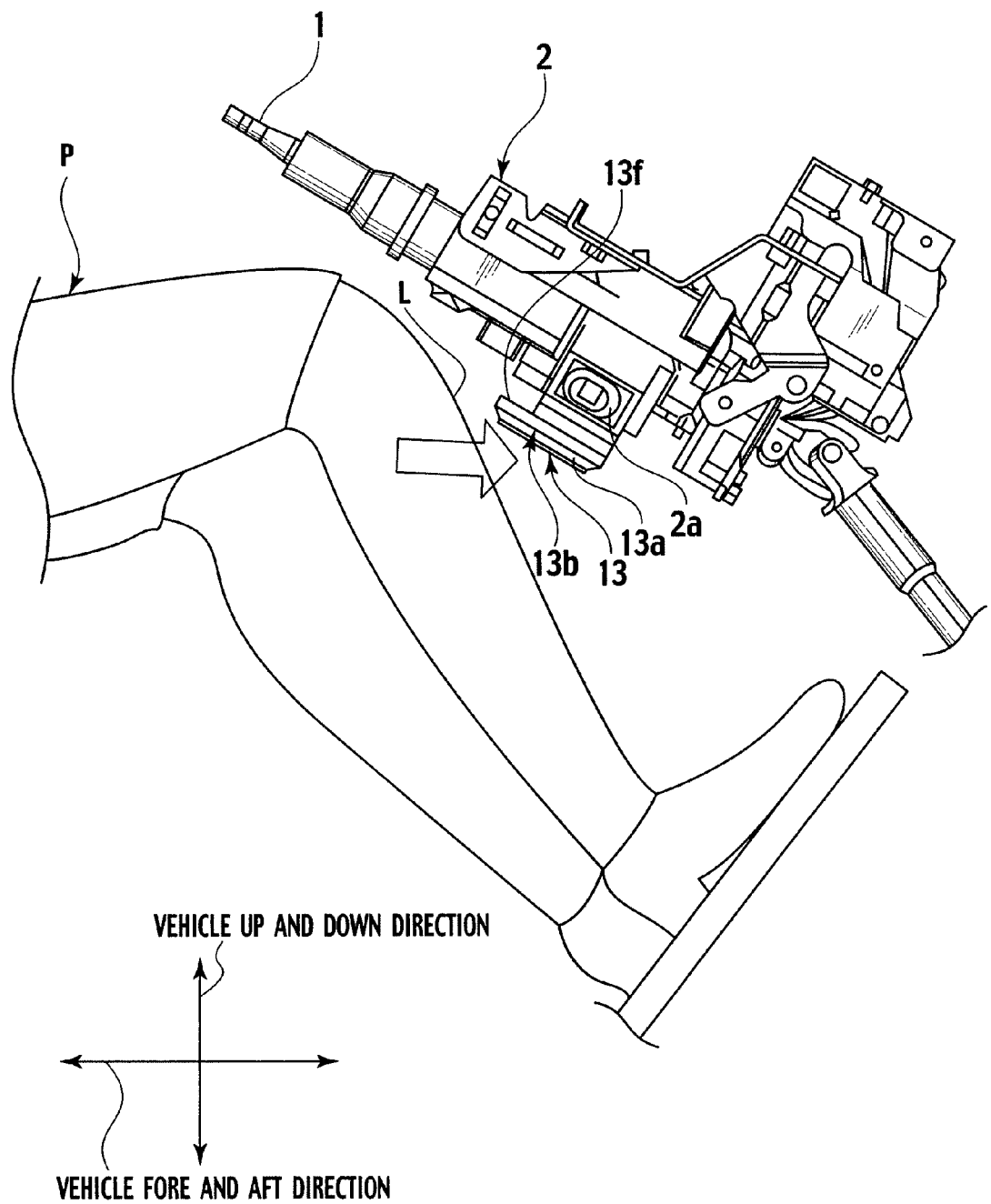
FIG. 9 is a side view showing a relationship between the passenger's leg and the remaining protective member after the steering lock body drops.
Figure 10:
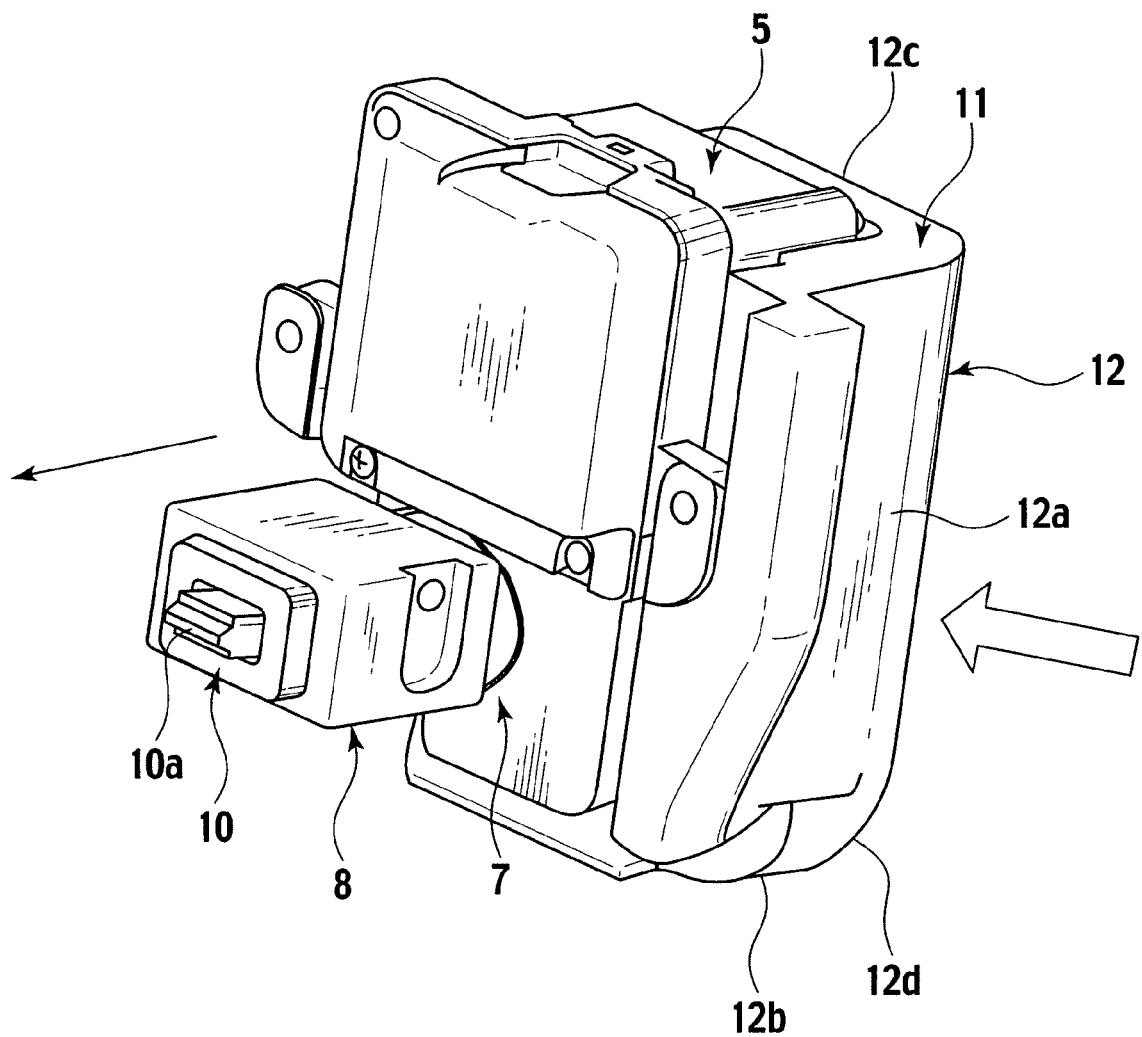
FIG. 10 is a perspective view of the steering lock device-added structure according to the embodiment before the steering lock device-added structure is attached to a unit attachment arm.

In this embodiment, moreover, as shown in FIG. 9, a protrusion 13f is provided on an end portion of the neck portion 13b on the passenger's side. The column protective member 13 is composed so that the leg L can abut on the protrusion 13f in advance of the other portions.

Furthermore, as shown in FIG. 4, such a separated position of the steering lock body 6 by the constricted portion 7 is set to be more inside than a divided position of the steering lock protective member 12 and the column protective member 13 in a diameter direction d of the steering shaft 1.

Moreover, as shown in FIG. 3, the steering column cover 3 that covers the steering column 2 according to this embodiment is mounted thereon so as to be located more outside than the fracture inducing portion 7 in the diameter direction d of the steering shaft 1.

Next, a description will be made of functions and effects of the steering lock device-added structure according to this embodiment. In the above-described steering lock device-added structure, in the case where the steering lock unit 5 is mounted on the unit attachment arm 2a on the outside surface of the steering column 2 on the vehicle body side, the steering lock unit 5 is covered with the steering lock protective member 12. Specifically, the back side surface 6b, the lower side surface 6c and the right side surface 6d, which are the outside surfaces of the cover member 6a of the steering lock unit 5, are covered with the steering lock protective member 12. Therefore, it becomes difficult to break the steering lock unit 5, whereby the vehicle can be prevented from being stolen more. In addition, in this embodiment, as shown by an outline arrow in FIG. 10, the steering lock protective member 12 is attached onto the steering lock unit 5 from oblique sideward on a driver's seat side, and thereby can be easily fixed thereto. Therefore, no limitations are imposed on an order of attaching the steering lock protective member 12, and attachment workability thereof can be made favorable.

Moreover, in this embodiment, the lower surface of the steering column 2 is covered with the column protective member 13 in advance. Accordingly, as shown in FIG. 1, when the insert coupling portion 8 of the steering lock unit 5 is inserted and fitted into an inner space of the unit attachment arm 2a, the recess 12e of the lower side surface 6c and the neck portion 13b of the column protective member 13 are made to overlap each other in the up and down direction of the vehicle body, and further, are provided adjacent to each other. As described above, the lower surfaces of the steering column 2 and the steering lock unit 5 are covered substantially entirely with the steering lock protective member 12 and the column protective member 13. Hence, even if the leg L of the passenger P, which is shown in FIGS. 6 and 7, strikes against the steering lock unit 5, the leg L is protected without directly abutting on the steering column 2 and the steering lock unit 5.

Furthermore, when the knee and the like of the passenger P abut on the steering lock unit 5 and a load of a predetermined value or more is applied thereto owing to collision of the vehicle, and so on, as shown in FIG. 8, the steering lock unit 5 is separated from the steering column 2 by the constricted portion 7 formed in the insert coupling portion 8. The outside surfaces of the steering lock unit 5 thus separated are covered with the steering lock protective member 12. Specifically, the back surface portion 12a, lower surface portion 12b and outside surface portion 12c of the steering lock protective member 12 are attached onto the three surfaces, which are the back side surface 6b, the lower side surface 6c and the right side surface 6d among the outside surfaces of the steering lock unit 5, respectively. Accordingly, even if any of the back surface portion 12a, the lower surface portion 12b and the outside surface portion 12c is peeled off from one outside surface of the steering lock unit 5, the other surfaces portions are kept on being attached onto the other outside surfaces, and the other outside surfaces of the steering lock unit 5 are maintained to be covered with the steering lock protective member 12. Hence, even if the steering lock unit 5 drops in the vehicle and bounces off some spot in a vehicle cabin, since the steering lock unit 5 is maintained to be covered with the steering lock protective member 12, a magnitude of the bounce is reduced, thus making it possible to reduce an influence of the drop of the steering lock unit 5, which is given to the passenger P. In this case, in this embodiment, the three surfaces which are the back side surface 6b, the lower side surface 6c and the right side surface 6d are covered with the steering lock protective member 12. Accordingly, the above-described influence to the passenger P can be further reduced in comparison with a steering lock unit of which one or two outside surfaces are covered.

In addition, in this embodiment, the lower surface of the steering column 2 is covered with the column protective member 13 provided independently of the steering lock protective member 12. Accordingly, even after the steering lock unit 5 separates from the steering column 2, the column protective member 13 remains on the lower surface of the steering column 2. Hence, a state is maintained, where the lower surface of the steering column 2 is covered with the neck portion 13b, the box-like extended portion 13c, the column covering portion 13d, the arm covering portion 13e and the like. Hence, as shown in FIG. 9, the leg L and the like of the passenger P can be protected from the lower surface of the steering column 2.

Moreover, in this embodiment, as shown in FIG. 9, the protrusion 13f is provided on the end portion of the neck portion 13b on the passenger's side, and the column protective member 13 is composed so that the leg L can abut on the protrusion 13f in advance of the other portions. Accordingly, an energy absorption amount is increased, whereby the leg L and the like of the passenger P can be effectively protected from the lower surface of the steering column 2.

Furthermore, as shown in FIG. 4, the separated position of the steering lock body 6 by the constricted portion 7 is set to be more inside than the divided position of the steering lock protective member 12 and the column protective member 13 in the diameter direction of the steering shaft 1. Accordingly, even if a fractured surface caused by the constricted portion 7 becomes sharp, the fractured surface is covered with the neck portion 13b, whereby an apprehension that the fractured surface may directly come into contact with the leg L of the passenger P can be reduced. Moreover, the neck portion 13b is composed so as to partially overlap the recess 12e in the up and down direction of the vehicle body. Accordingly, areas can be increased, by which the steering column 2 and the steering lock unit 5 are covered with the column protective member 13 and the steering lock protective member 12, respectively. Furthermore, a gap between the column protective member 13 and the steering lock protective member 12 can be reduced, and accordingly, protectability thereof for the leg L of the passenger P is further enhanced.

Moreover, the column protective member 13 and the steering lock protective member 12 composed of apparently the same or substantially the same material as a material of the column protective member 13 are provided adjacent to each other. Therefore, the constricted portion 7 is covered with the column protective member 13 and the steering lock protective member 12, and accordingly, the position of the constricted portion 7 is less likely to be specified. Hence, the vehicle can be prevented from being stolen much more, and appearance quality of the steering lock device-added structure can be made favorable.

Furthermore, as shown in FIG. 3, the steering column cover 3 that covers the steering column 2 is mounted thereon so as to be located more outside than the fracture inducing portion 7 in the diameter direction d of the steering shaft 1. Therefore, the constricted portion 7 is covered with the steering column cover 3, and accordingly, the position of the constricted portion 7 is less likely to be specified. In addition, even if the fractured surface caused by the constricted portion 7 becomes sharp, the fractured surface is located inside of the steering column cover 3 and is covered therewith, and accordingly, the apprehension that the fractured surface may directly come into contact with the leg L of the passenger P can be further reduced.

Although the description has been made above in detail of the embodiment of the present invention with reference to the drawings, specific configurations of the present invention are not limited to this embodiment, and design changes to an extent of not departing from the spirit of the present invention are incorporated in the present invention. Specifically, in this embodiment, as shown in FIG. 3, the steering lock unit 5 is integrally mounted onto the steering column 2 while interposing therebetween the hollow cylindrical unit attachment arm 2a extended obliquely downward on the right side; however, the present invention is not particularly limited to this. For example, in the case of viewing the structure as shown in FIG. 3, the steering lock unit 5 may be mounted obliquely downward on a left side or horizontally. Specifically, in the present invention, a mounting angle, shape, quantity and material of the steering lock unit 5 are not particularly limited as long as the steering lock protective member 12 that covers the outside surfaces of the steering lock unit 5 and the column protective member 13 that covers the lower surface of the steering column 2 are provided adjacent to each other.

Moreover, in this embodiment, the steering lock protective member 12 and the column protective member 13 are composed independently of each other; however, the present invention is not particularly limited to this. The steering lock protective member 12 and the column protective member 13 may be partially coupled to each other as long as they are divided when the steering lock unit 5 is separated by the constricted portion 7 as the fracture inducing portion.

The entire content of a Japanese Patent Application No. P2007-225218 with a filing date of Aug. 31, 2007 is herein incorporated by reference.

Although the invention has been described above by reference to certain embodiments of the invention, the invention is not limited to the embodiments described above and modifications may become apparent to these skilled in the art, in light of the teachings herein. The scope of the invention is defined with reference to the following claims.

What is claimed is:

1. A steering lock device-added structure, comprising:
   a steering shaft;
   a steering column which rotatably houses the steering shaft therein;
   a steering lock unit which is disposed on an outside surface of the steering column, and disables rotation of the steering shaft, wherein the steering lock unit is coupled to the steering column while interposing a fracture inducing portion therebetween;
   a steering lock protective member which covers an outside surface of the steering lock unit; and
   a column protective member which covers a lower surface of the steering column, and is provided adjacent to the steering lock protective member,
   wherein the steering lock protective member is attached and fixed to the outside surface of the steering lock unit, and is separated from the column protective member,
   wherein a part of the column protective member is extended along a unit attachment arm integrally extended from the outside surface of the steering column, the part of the column protective member being extended as an arm covering portion which covers a lower surface of the unit attachment arm, and
   wherein a lock unit-side edge portion of the arm covering portion has a neck portion extended downward of the fracture inducing portion, and the neck portion is made to partially overlap the steering lock protective member.

2. The steering lock device-added structure according to claim 1, wherein a position of the fracture inducing portion is set to be more inside than a divided position of the steering lock protective member and the column protective member in a diameter direction of the steering shaft.

3. The steering lock device-added structure according to claim 1, further comprising:
   a steering column cover which covers the steering column, wherein the steering column cover is located more outside than the fracture inducing portion in a diameter direction of the steering shaft.

4. A steering lock device-added structure, comprising:
   a steering shaft;
   a steering column which rotatably houses the steering shaft therein;
   a steering lock unit which is disposed on an outside surface of the steering column, and disables rotation of the steering shaft, wherein the steering lock unit is coupled to the steering column while interposing a fracture inducing portion therebetween;
   a steering lock protective member which covers an outside surface of the steering lock unit; and
   a column protective member which covers a lower surface of the steering column, and is provided adjacent to the steering lock protective member,
   wherein a part of the column protective member is extended along a unit attachment arm integrally extended from the outside surface of the steering column, the part of the column protective member being extended as an arm covering portion which covers a lower surface of the unit attachment arm, and
   a lock unit-side edge portion of the arm covering portion has a neck portion extended downward of the fracture inducing portion, and the neck portion is made to partially overlap the steering lock protective member.

5. A method comprising:
   providing a steering lock device-added structure comprising: a steering shaft; a steering column which rotatably houses the steering shaft therein; a steering lock unit which is disposed on an outside surface of the steering column, and disables rotation of the steering shaft, wherein the steering lock unit is coupled to the steering column while interposing a fracture inducing portion therebetween; a steering lock protective member which covers an outside surface of the steering lock unit; and a column protective member which covers a lower surface of the steering column, and is provided adjacent to the steering lock protective member, wherein the steering lock protective member is attached and fixed to the outside surface of the steering lock unit, and is separated from the column protective member; and
   fracturing the fracture inducing portion while maintaining a state of covering the outside surface of the steering lock unit with the steering lock protective member,
   wherein a part of the column protective member is extended along a unit attachment arm integrally extended from the outside surface of the steering column, the part of the column protective member being extended as an arm covering portion which covers a lower surface of the unit attachment arm, and
   wherein a lock unit-side edge portion of the arm covering portion has a neck portion extended downward of the fracture inducing portion, and the neck portion is made to partially overlap the steering lock protective member.

* * * * *